United States Patent [19]
Leiber et al.

[11] Patent Number: 4,603,918
[45] Date of Patent: Aug. 5, 1986

[54] HYDRAULIC DUAL-CIRCUIT TANDEM MASTER BRAKE CYLINDER

[75] Inventors: Heinz Leiber, Oberriexingen; Hannes Bertling, Vaihingen, both of Fed. Rep. of Germany

[73] Assignee: Robert Bosch GmbH, Stuttgart, Fed. Rep. of Germany

[21] Appl. No.: 682,824

[22] Filed: Dec. 19, 1984

Related U.S. Application Data

[63] Continuation of Ser. No. 375,899, May 7, 1982, abandoned.

[30] Foreign Application Priority Data

Dec. 18, 1981 [DE] Fed. Rep. of Germany ....... 3150120
Mar. 24, 1982 [DE] Fed. Rep. of Germany ....... 3210735

[51] Int. Cl.⁴ .................. B60T 8/02; B60T 11/20; B60T 13/14
[52] U.S. Cl. .................... 303/6 R; 60/545; 60/547.1; 60/548; 188/359; 188/345; 303/52; 303/114
[58] Field of Search ............ 303/114, 119, 50–52, 303/10, 6 R, 100; 188/181 A, 358, 359, 360, 345; 60/547.1, 591, 548, 545, 579, 582; 91/391 R

[56] References Cited

U.S. PATENT DOCUMENTS

| | | | |
|---|---|---|---|
| 3,978,667 | 9/1976 | Ohara | 60/582 X |
| 4,126,996 | 11/1978 | Leiber | 60/579 X |
| 4,137,718 | 2/1979 | Belart | 60/579 X |
| 4,206,605 | 6/1980 | Mehren et al. | 60/545 |
| 4,405,183 | 9/1983 | Resch | 303/114 X |
| 4,422,293 | 12/1983 | Ewald | 60/547.1 |
| 4,482,192 | 11/1984 | Leiber | 303/119 X |

Primary Examiner—Douglas C. Butler
Attorney, Agent, or Firm—Edwin E. Greigg

[57] ABSTRACT

A hydraulic dual-circuit tandem master brake cylinder intended for use in brake systems of motor vehicles is proposed, to which a closed brake circuit (I) and an open brake circuit (II), the latter reinforced by auxiliary pressure, are connected. In order to switch the control valve, the main brake cylinder has a foot-actuated push rod as an actuation member, with transmission of force via a control contour or a travel-limiting spring, and it furthermore has an auxiliary piston member near the pedal, this member having an effective surface for making the feedback of the brake pressure which has been established perceptible. In this manner, a small, compact master brake cylinder construction which is very favorable in price is created. It is furthermore of advantage that the pedal characteristic is designed optimally in terms of human engineering. The main cylinder can also be used at little expense for an anti-wheel-lock apparatus as well.

5 Claims, 6 Drawing Figures

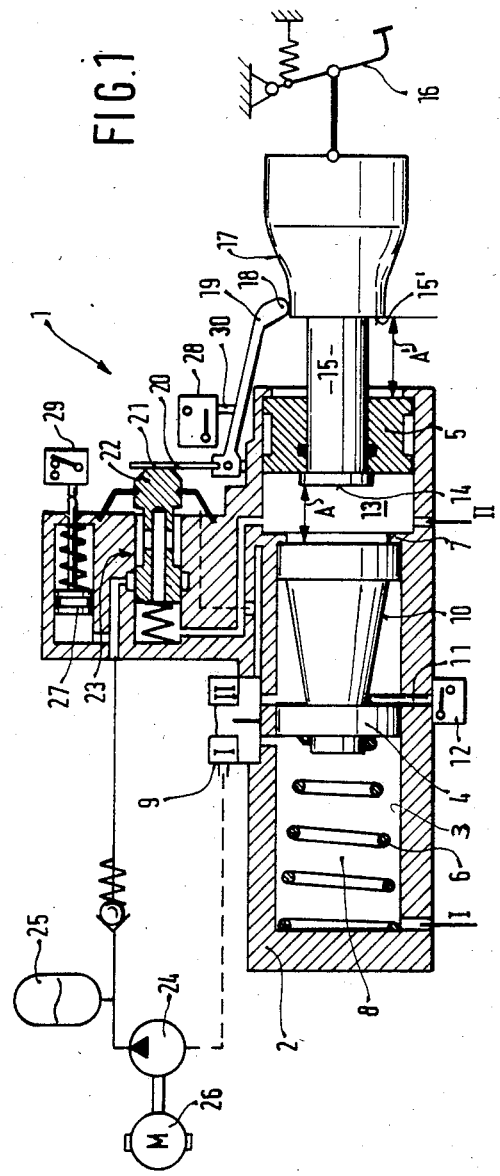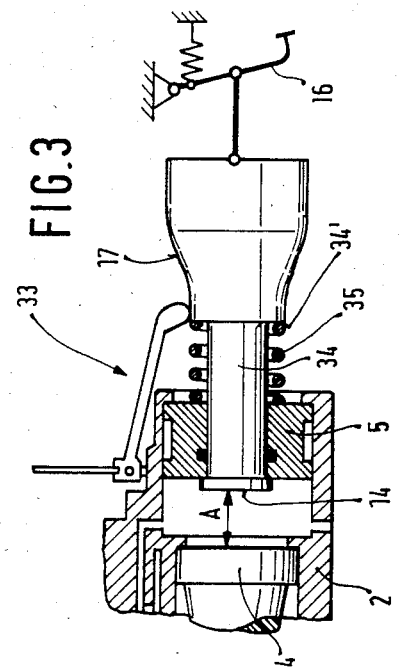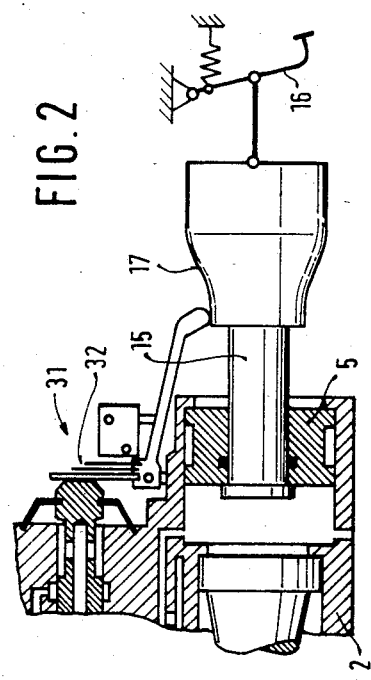

HYDRAULIC DUAL-CIRCUIT TANDEM MASTER BRAKE CYLINDER

This is a continuation of copending application Ser. No. 375,899 filed May 7, 1982 now abandoned.

BACKGROUND OF THE INVENTION

The present invention relates to a hydraulic dual-circuit tandem master brake cylinder for vehicle brake systems having a closed brake circuit and an open brake circuit. The closed brake circuit has a brake piston and the open brake circuit has an auxiliary piston/control valve device actuated by a push rod and reinforced by auxiliary pressure.

In this known master brake cylinder, it is difficult to make the actuation of the control valve sufficiently sensitive. Furthermore, given the disposition of the master brake cylinder and the amplifier in a row, the volume of the two brake circuits substantially determines the pedal-travel characteristic. Such systems are widely distributed. However, disposing dual-circuit master brake cylinders, and in particular a tandem master brake cylinder, in a row with an amplifier produces a structure of great length. Furthermore, the status of ventilation of a brake circuit or a failure in the brake circuit as well has a direct effect on the brake pedal. Futhermore, in the event of an amplification failure great force must be exerted by the foot on the pedal in order to produce braking pressure, since the dimensions of the master cylinder pistons can be designed only for intact amplifiers.

If a travel-limiting spring or some other travel simulator inserted between the brake pedal and the control valve is used, the travel-limiting spring determines the pedal characteristic.

In that event, the above-discussed disadvantages are avoided in part. This is true particularly if the two master cylinders are disposed parallel to and beside one another, as is known from German Offenlegungsschrift No. 29 07 922, for instance. However, such a design differs very greatly from present-day conventional constructions, so that mass production would have to be preceded by a great expenditure for testing.

OBJECT AND SUMMARY OF THE INVENTION

It is an object of the invention to provide an improved hydraulic dual-circuit tandem master brake circuit of the type described above.

This object is achieved by the provision of a control valve and an auxiliary piston member which are both actuated by a foot operated control push rod, with one effective surface of the auxiliary piston member, located near the foot pedal, being embodied as part of the control push rod.

The hydraulic dual-circuit tandem master brake cylinder according to the invention as summarized above has the advantage over the prior art that the design having the travel-limiting spring is substantially improved, while the necessary expenditure is much more favorable.

Furthermore, it is possible to utilize the engineering technology for conventional, mass-produced master cylinders, and in particular for a stepped master cylinder. By utilizing the piston for supporting the pedal push rod, an inexpensive design is attained which saves both weight and space. The structural length of the complete brake force amplifier and auxiliary piston is comparable to that of a simple master brake cylinder.

It is furthermore advantageous that by means of various embodiments of a control contour for the purpose of force diversion, the pedal characteristic can be designed optimally in terms of human engineering.

It is also advantageous that only a few seals are required. The seal friction is thereby low, which assures that there will be little hysteresis and that brake force can be applied sensitively.

The invention will be better understood and further objects and advantages thereof will become more apparent from the ensuing detailed description of preferred embodiments taken in conjunction with the drawings.

BRIEF DESCRIPTION OF THE DRAWINGS

FIG. 1 illustrates a first embodiment of a master brake cylinder according to the present invention;

FIG. 2 illustrates an embodiment like that of FIG. 1 but with a different travel-limiting spring;

FIG. 3 illustrates a modification with the spring supported on the piston near the pedal;

DESCRIPTION OF THE PREFERRED EMBODIMENTS

Figure 4:
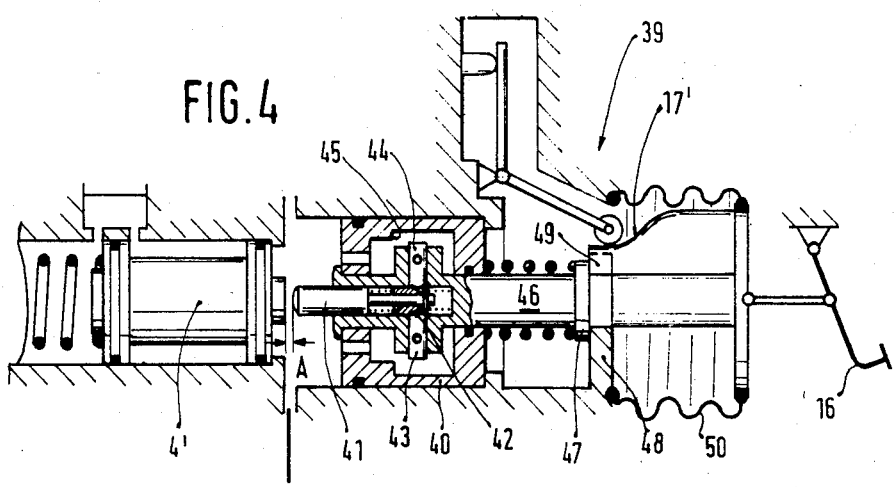
FIG. 4 illustrates a control contour surface directly on the piston near the pedal.

A hydraulic dual-circuit tandem master brake cylinder 1 has a housing 2 with a cylinder 3, in which two pistons 4 and 5 are coaxially disposed. The front piston 4 is generally held fast at a shoulder 7, under the influence of a restoring spring 6. The shoulder 7 defines a work chamber 8, to which one brake circuit I is connected and which communicates in the illustrated outset position of the piston 4 with a refill container 9. In this manner, a closed brake circuit is created. Between two sliding surfaces, the piston 4 has an oblique face 10, and a push rod 11 of a switch 12 can slide along this oblique face.

The second piston 5 has a somewhat larger diameter than that of the piston 4. The master brake cylinder 1 is thus a stepped master cylinder. The piston 5, the shoulder 7 and housing 2 define a chamber 13, to which a brake circuit II, for instance, is connected. The piston 5 is an annular piston, whose effective surface area is supplemented by an end face 14 of a pedal push rod 15 passing through this piston. In this manner, an auxiliary piston member 5/14 is thus created from the piston 5 and the end face 14.

The push rod 15 is articulated on a brake pedal 16 and has a control contour surface 17, along which one end 18 of a valve actuation lever 19 slides. The lever 19 is supported on the housing 2, and its other end 21 is embodied as a travel-limiting spring in the form of a leaf spring 20 and rests on an outer end of a slide 22 of a control valve 23 which is parallel with the housing 2, which in its two possible terminal positions connect the chamber 13 either with a relief source (refill container 9) or with a source of pressure medium 24/25 comprising a pump 24 and a reservoir 25. A motor 26 has the task of driving the pump 24.

Parallel to the control valve 23, there is situated a piston 27 and a switch 29 actuated by pressure medium via the piston 27; with this switch 29, the reservoir pressure can be monitored. A third switch 28 has a push rod 30, with which the movement of the lever 19 can be scanned. It must be noted further that the end face 14 generally is at a distance A from the piston 4; this distance A is greater than the reciprocating stroke of the piston 15 associated with the full stroke of the control valve 23.

MODE OF OPERATION

Upon actuation of the brake pedal 16, the lever 19 is deflected via the control contour surface 17. The control valve 23 is actuated and directs a corresponding auxiliary pressure into the chamber 13. This pressure reaches the brake circuit II directly, and once in chamber 13 is exerted against the piston 4 as well, so that this piston is displaced counter to the force of the spring 6. This displacement of the piston 4 interrupts the communication of the work chamber 8 with the refill container 9, and then generates a pressure in the chamber 8 which is effective as braking pressure in the brake circuit I.

The pressure directed into both brake circuits I and II now has a feedback effect on the pedal push rod 15, and because of this feedback the driver is capable of exerting a precisely meterable braking pressure which is proportional to the pedal force. As the deflection of the lever 19 increases, and assuming that the length of lever 19 remains the same, the leaf spring 20, which is connected with the lever 19 and indicates the travel path, is prestressed by the same amount. The pressure generated by the control valve 23 has a feedback effect on the push rod 15 via the control contour surface 17.

The deflection of the lever 19 as a function of the movement of the push rod 15 is freely selectable by means of various contoured shapes of the control contour surface 17 which may be established. In this manner, an amplification characteristic which is optimal in terms of human engineering can be attained, although such a characteristic is possible to only a limited extent in known travel-simulator springs.

If brake circuit II fails, the piston member 5/14 acts as a positive displacement piston and in a conventional manner generates a pressure increase in the chamber 13 and thus in brake circuit I as well, this pressure increase becoming effective in brake circuit I as well via the piston 4.

If there is a failure in the hydraulic auxiliary pressure supply, the chamber 13 remains without pressure. After a distance A' has been traversed by the push rod 12, a collar face 15' of the push rod 15 comes to rest on the piston 5, whereupon this piston generates pressure in brake circuit II. This pressure likewise acts upon piston 4 in order to generate pressure in brake circuit I. Then there is a pressure increase in brake circuit I as well. The only effective counteracting force is the force of the springs 6, 20 and that of a pedal spring.

The master brake cylinder is combined with three electrical switches 12, 28 and 29. The switch 29 has two contact positions. Generally (that is, if the reservoir 25 has full pressure), this switch is in its neutral position. If the pressure in reservoir 25 drops to its lower threshold value, then the switch 29 attains its first contact position, in which the supply of auxiliary pressure begins by the switching on of the motor 26, and the reservoir 25 is again brought to maximum pressure. The second contact position of the switch 29 is attained if the reservoir 25 has too little pressure or if the supply of auxiliary pressure has failed.

The switch 28 likewise has two contact positions. A first contact position is assumed upon the actuation of the brake, in order to turn on the vehicle brake light. A second contact position is attained by the switch 28 in order to provide a comparison signal to the switch 12, which can be evaluated for the purpose of indicating failure or poor ventilation of brake circuit I. If with a middle pedal stroke, or in other words at average braking pressures, the piston member 5/14 is extened excessively far, then the contacts of both switches 12 and 28 are closed. This is then an indication of a defect in brake circuit I.

In FIG. 2, a modified master brake cylinder 31 is shown which has an improved travel-limiting spring 32. This travel-limiting spring 32 is embodied as a laminated axial spring, with a characteristic curve which is either broken or progressive. This embodiment illustrates the many variant possibilities for the travel-limiting spring.

A further improvement in the pedal characteristic is attainable in accordance with the embodiment shown in FIG. 3. Here, a master brake cylinder 33 has a strong spring 35 on its pedal push rod 34; if the supply of auxiliary pressure is intact, then the force of this spring 35 is effective as a restoring force, counter to the pedal force, as a supplement to the push rod force effected by the pressure medium.

In this design, a substantial brake pressure can be generated within the range of the pedal stroke required for full actuation of the brake valve, and this brake pressure then increases in a highly progressive manner after the control valve path has been traversed.

In the embodiment of the master brake cylinder 33 having a spring 35 as noted, two variants are conceivable in terms of the distance A between the push rod 34 and the piston 4; these variants can be optimized for a particular brake circuit layout.

In the first variant, the distance A is relatively small; this means that at first, while the pedal has traveled only a short way, the same pressure conditions prevail in both brake circuits I and II. Then the pedal push rod 34 meets the piston 4 and thus generates a higher brake pressure in brake circuit I than does the spring 35, which acts upon the piston 5. Now, however, if a collar face 34' of the push rod 34 on the piston 5 comes into effect, then the result is a highly progressive pressure increase; with longer pedal travel, the result in turn is that the two brake pressures in brake circuits I and II are equal. This design is advantageous for a diagonal brake circuit layout, because in the event of violent braking not all the wheels will lock at once; instead, the wheels of one diagonal will advance ahead of the others because of the higher brake pressure, so that the driver will as a rule be given forewarning.

In the second variant, there is a greater distance A between the push rod 34 and the piston 4; in the case of a failure of the supply of hydraulic auxiliary pressure, the result then is a synchronous course of the brake pressures in the two brake circuits as a function of the pedal actuation.

In the embodiment of FIG. 3, a weaker restoring force is attained if there is a failure of the supply of auxiliary pressure in the first portion of the pedal stroke than is the case if the auxiliary pressure supply is intact. In order to prevent this situation, the embodiment shown in FIG. 4 is provided. This construction rests on the conception that if the auxiliary pressure supply is intact, the front piston 4' (brake circuit I) moves ahead in advance of the pedal stroke, given appropriate dimensioning; as a result, the pedal-actuated push rod does not come into contact with the piston 4'. In contrast, if the distance A is short, the push rod does come into contact with the piston 4'. This fact can now be utilized, in a master brake cylinder 39, in order to insert an intermediate push rod 41 into a position 40, which corresponds to piston 5 of FIGS. 1–3; via a cone 42. This push rod 41 actuates two radially disposed prongs 43 and 44. The outer ends of the prongs 43 and 44 are intended for cooperation with an inner shoulder 45 in the piston 40. A coupling 43, 44, 45 is thus created.

Now if the brake pedal 16 is actuated further than is required by the distance A, the prongs 43 and 44 are moved outward from the cone 42. They come to rest behind the inner shoulder 45, thus carrying along the piston 40 as well, for the sake of a further progressive pressure increase.

In the embodiment illustrated in FIG. 4, there is the further advantage that a pedal push rod 46 moved by the pedal 16 is supported in a twofold manner: on the front end via the piston 40 and on the back end following a collar 47. Such a long distance between support points assures favorable friction conditions. Furthermore, a control contour surface 17' can be attached at one end as a flat piece on the push rod 46, and a rear bearing 48 can be provided with a recess 49 for the control contour surface 17' which acts at the same time as a means for preventing twisting. It is also possible with this embodiment for the back end of the master brake cylinder 39 to be covered with a bellows diaphragm 50 in order to protect it from corrosion and dust.

Figure 5:
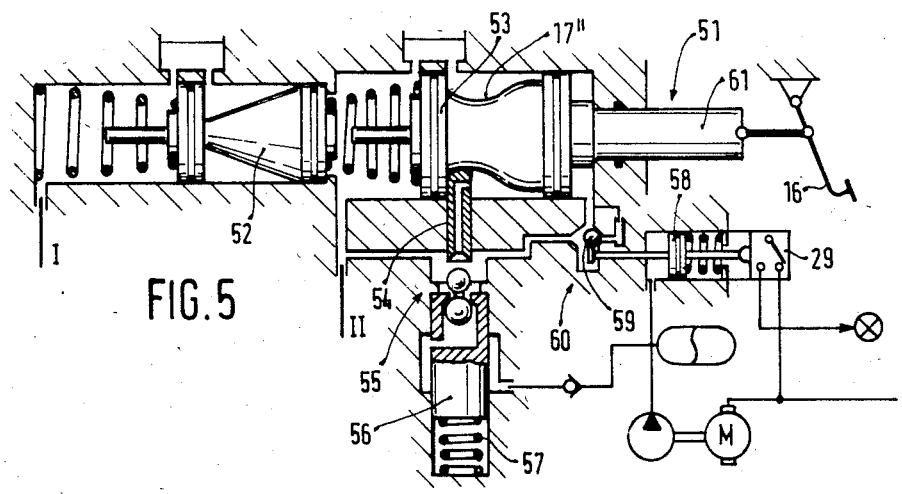
FIG. 5 illustrates a different actuation of the control valve.

A somewhat different embodiment is shown in FIG. 5. Here, a conventional tandem master brake cylinder construction 51 having two conventional pistons 52 and 53 is used. A control contour surface 17" is incorporated here into the second piston 53, which is actuatable by a pedal push rod 61.

A hollow push rod 54 is disposed laterally in the cylinder wall and serves to actuate a control valve 55. Behind the control valve 55 there is a valve piston 56, which is supported by a travel-limiting spring 57 functioning as the travel simulator of the apparatus. A piston 58 of the switch 29 (see FIG. 5) which is subject to the reservoir pressure is coupled here to a valve closing body 59, which is the closing body of a switchover valve 60.

In this embodiment, the valve piston 56 is moved in proportion to the brake pressure directed into the circuit. The brake pressure directed into brake circuit II via the control valve 55 is exerted back via the switchover valve 60, which is open when the supply of auxiliary pressure is intact, upon the push rod 61 and thus produces a pressure-proportional restoring force. If there has been a failure in the supply of auxiliary pressure, the switchover valve 60 switches to its other position and thereby prevents brake fluid from flowing in onto the back side of piston 53. At the same time, the chamber for pressure relief which is located at this rear side is made to communicate via the switchover valve 60 with the refill container.

Figure 6:
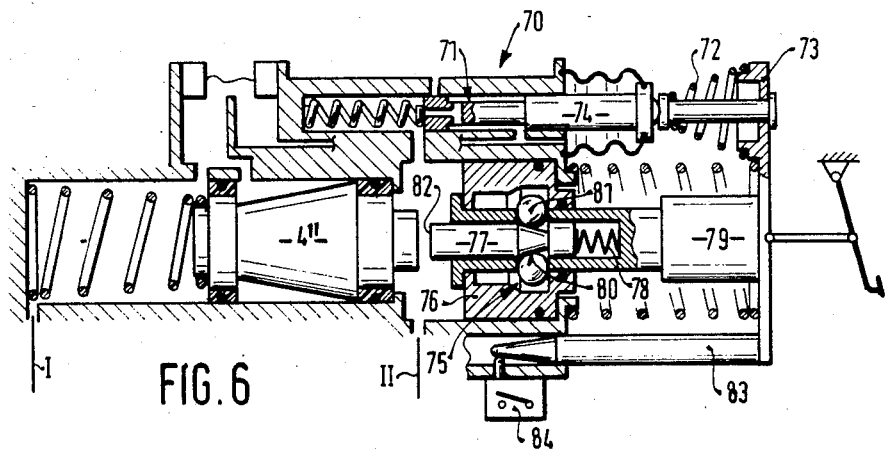
FIG. 6 illustrates an embodiment having a control valve actuated by pedal plate.

Finally, FIG. 6 illustrates an embodiment 70 in which a control valve 71 is actuatable by a pedal plate 73 via a travel-limiting spring 73. The control valve 71 has a control slide 74, which is equipped with relatively long slide faces. Similarly to the embodiment of FIG. 4, here as well a coupling 75 is provided between an auxiliary piston member 76/82 and a pedal push rod 79; this coupling becomes effective when the front end 82 of an intermediate push rod 77 strikes the front piston 4". The intermediate push rod 77 is supported via a spring 78 on the pedal push rod 79 and has a conical face 80, on which a plurality of balls 81 rest. The balls are distributed uniformly on a circle. If the balls 81 are forced outward by the conical face 80, they establish a connection between the pedal push rod 79 and a piston 76 of the auxiliary piston member 76/82. Then, if there is a failure of the auxiliary pressure, the piston 76 is moved in a coupled manner as well, in order to attain a further progressive pressure increase.

In this embodiment, the control slide 74 is actuated immediately upon actuation of the brake, via the travel-limiting spring 72. It is thus possible for the brake pressure to build up very quickly.

The control slide 74, equipped with long slide faces, switches the supply of energy to brake circuit II, and braking occurs in both brake circuits I and II.

If the energy supply fails, then during the further movement of the control slide 74 the full pedal path can be utilized for actuation of the auxiliary piston member 76/82. The control slide 74 is thereby displaced to its terminal stop, and only then is the last portion of the stroke of the travel-limiting spring 72 exploited.

Should the control slide 74 block, then the possible travel of the travel-limiting spring can be utilized for actuating the auxiliary piston member 76/82. In this case, a braking pressure is generated in the closed brake circuit I with the piston 4" via the intermediate push rod 77.

In this master brake cylinder design 70 as well, a switch 84 is provided which is actuatable via a push rod 83 fixed to a pedal plate; the significance of this switch 84 will be discussed later.

It should also be noted that in the master brake cylinder 1, 31, 33, 39 and 51 as well, if the control valve should jam this will not cause any failure in generating braking pressure. In such a case, the master brake cylinder functions just as in the case of a failure of the auxiliary pressure.

It should furthermore be noted that the front seal of each of the two seals of the pistons 5, 40 and 53 is embodied as an expansion sleeve, so that if there is a failure of the supply of auxiliary pressure, the full functioning of a master cylinder is still provided.

The proposed master brake cylinder designs 1, 31, 33, 39, 51 and 70 are excellently well suited for combination with an anti-wheel-lock apparatus, because they are very small in size and have good response behavior. Then it is possible for the signals of the switches 12, 28, 29, 84 to be evaluated in the electronic control unit of the anti-wheel-lock apparatus and linked if needed with anti-wheel-locking signals.

The foregoing relates to preferred exemplary embodiments of the invention, it being understood that other embodiments and variants thereof are possible within the spirit and scope of the invention, the latter being defined by the appended claims.

What is claimed and desired to be secured by Letters Patent of the United States is:

1. A hydraulic dual-circuit tandem master brake cylinder for vehicle brake systems having a closed brake circuit and an open brake circuit, the closed brake circuit including: a brake piston which serves to pressurize said closed brake circuit, and the open brake circuit including: a main brake cylinder, an annular piston member in said brake cylinder, and a foot actuated pedal push rod, said foot-actuated pedal push rod including a small diameter portion that extends through said annular piston member and extends into a fluid pressure chamber for said open brake circuit, a larger diameter portion that includes a control contour surface and which includes a frontal shoulder on the pedal side of said annular piston member between said annular piston and said control contour surface, and a brake-pressure-generating piston end face in said chamber which is larger than said small diameter portion of said pedal push rod, said annular piston member and said piston end face of said pedal push rod forming a rear wall in said fluid pressure chamber, a slide control valve means actuated by said control contour surface of said larger diameter portion of said pedal push rod, and said pedal push rod actuates said annular piston member in said open brake circuit and said brake piston in said closed brake circuit in the event of a pressure failure.

2. The hydraulic dual-circuit tandem master brake cylinder for vehicle brake systems as defined in claim 1, wherein the brake piston of the closed brake circuit is spaced apart from the annular piston member by a predetermined distance, which is greater than the full stroke of the pedal push rod.

3. The hydraulic dual-circuit tandem master brake cylinder for vehicle brake systems as defined in claim 1, wherein the open brake circuit further includes at least one switch for recognizing brake circuit failure.

4. A hydraulic dual-circuit tandem master brake cylinder for vehicle brake systems having a closed brake circuit and an open brake circuit, the closed brake circuit including: a brake piston which serves to pressurize said closed brake circuit, and the open brake circuit including: a main brake cylinder, an annular piston member in said brake cylinder, and a foot actuated pedal push rod, said foot-actuated pedal push rod including a small diameter portion that estends through said annular piston member and extends into a fluid pressure chamber for said open brake circuit, a larger diameter portion that includes a control contour surface and which includes a frontal shoulder on the pedal side of said annular piston member, and a brake-pressure-generating piston end face in said chamber which is larger than said small diameter portion of said pedal push rod, said annular piston member and said piston end face of said pedal push rod forming a rear wall in said fluid pressure chamber, a slide control valve means, said slide control valve means includes a spring element, a lever, and a control valve, wherein the spring element is inserted between the control valve and the control contour surface and actuated by said control contour surface of said larger diameter portion of said pedal push rod, and said pedal push rod actuates said annular piston member in said open brake circuit and said brake piston in said closed brake circuit in the event of a pressure failure.

5. A hydraulic dual-circuit tandem master brake cylinder for vehicle brake systems having a closed brake circuit and an open brake circuit, the closed brake circuit including: a brake piston which serves to pressurize said closed brake circuit, and the open brake circuit including: a main brake cylinder, an annular piston member in said brake cylinder, and a foot actuated pedal push rod, said foot-actuated pedal push rod including a small diameter portion that estends through said annular piston member and edtends into a fluid pressure chamber for said open brake circuit, a larger diameter portion that includes a control contour surface and which includes a frontal shoulder on the pedal side of said annular piston member, and a brake-pressure-generating piston end face in said chamber which is larger than said small diameter portion of said pedal push rod, said annular piston member and said piston end face of said pedal push rod forming a rear wall in said fluid pressure chamber, a slide control valve means actuated by said control contour surface of said larger diameter portion of said pedal push rod, said slide control valve means includes a lever, and a control valve actuatable via said lever, and said pedal push rod actuates said annular piston member in said open brake circuit and said brake piston in said closed brake circuit in the event of a pressure failure.

* * * * *